Oct. 19, 1948.                  E. E. MILLER                    2,451,856
                 MECHANICAL DEVICE FOR DETERMINING THE
                       FUTURE POSITION OF AIRCRAFT
                           Filed July 9, 1945
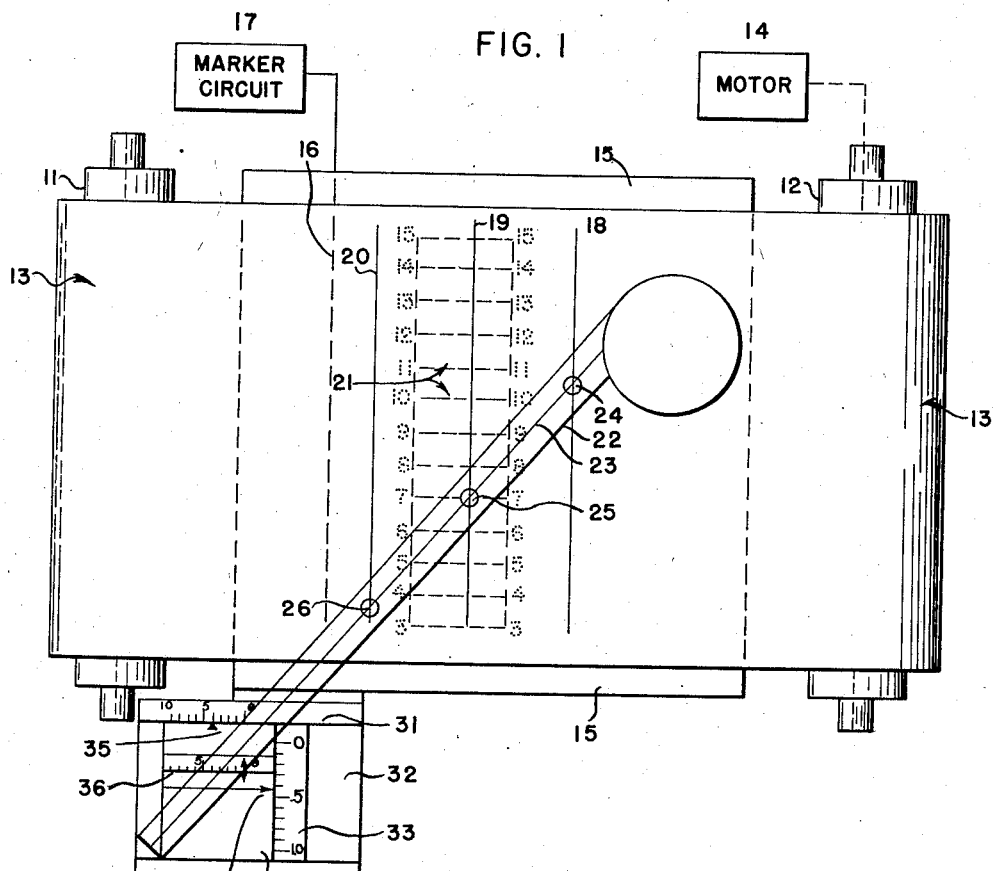
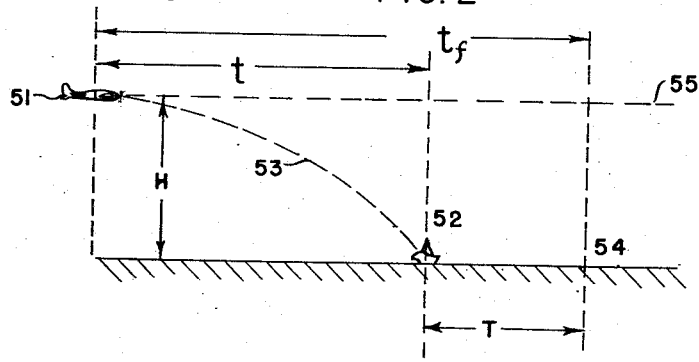
INVENTOR
EDWARD E. MILLER
BY
ATTORNEY Patented Oct. 19, 1948

2,451,856

UNITED STATES PATENT OFFICE 2,451,856

MECHANICAL DEVICE FOR DETERMINING THE FUTURE POSITION OF AIRCRAFT

Edward E. Miller, Cambridge, Mass., assignor, by mesne assignments, to the United States of America as represented by the Secretary of War Application July 9, 1945, Serial No. 604,055

3 Claims. (Cl. 33—1)

This invention relates to a means of the graphical presentation of data and more particularly to a means of determining the future position of aircraft.

According to conventional practice aircraft may be sent on missions such as bombing or photographic reconnaissance at such times and places as to prohibit navigation from the plane itself. In such cases the aircraft may be controlled or its control directed from a ground station with the aid of radar or radio object-locating equipment. It is highly desirable to be able to know the position of the aircraft without concentrating the radio object-locating equipment on that one particular aircraft or group of aircraft. Since the sweep periods of the radio object-locating equipment may be as long as 30 seconds, it is not possible in such cases to obtain data on the aircraft position oftener than once every 30 seconds. As the aircraft approaches its destination, it becomes imperative that a constant record be kept of the aircraft position in order to know the exact time at which it reaches its predetermined destination.

An object of the present invention, therefore, is to provide an improved presentation of target position which may be used in the guidance of the aircraft involved.

Another object of the present invention is to provide an improved device for indicating the time at which a bomb or other missile should be released from an aircraft in order that it strike a predetermined target.

For a better understanding of the invention, together with other and further objects thereof, reference is had to the following description taken in connection with the accompanying drawing in which:

Fig. 1 is a schematic drawing of one embodiment of the invention; and

Fig. 2 is a schematic diagram of a typical bombing run.

Referring now to the drawing and more particularly to Fig. 1 thereof, there is shown a timing device or mechanical graph which comprises rolls 11 and 12 on which is wound a paper strip 13. The roll 12 is driven by a motor 14, preferably of the synchronous type, whose speed is substantially constant. The paper passes over a transparent table 15 which may be a sheet of "Plexiglas" or other suitable transparent body affording a flat surface. A marking device 16 is imbedded in or adjacent to the table 15 and is aligned perpendicularly to the direction of movement of the paper 13. The marking device 16 may be a heater element so adapted that a surge of current through the heater element will burn a mark on the paper 13. A marker circuit 17 is provided which will apply current to the device 16 for a suitable period when a button or similar device actuates the circuit 17. Examples of lines burned on the paper 13 are shown by lines 18, 19 and 20. Etched on the surface of the table 15 are range lines 21. The lines 21 are numbered as shown from 3 to 15 and indicate distance of the aircraft from its target. The calibration may be in miles, thousands of yards or otherwise as desired. The numbers here used are exemplary only and not to be taken as limitations of the present invention. The range lines 21 are visible through the paper 13 when the table 15 is illuminated on the under side thereof by a light not shown. The zero range line of range lines 21 does not fall on the table 15 but is located at a point some distance from the edge thereof. A straight edge 22, preferably made of a transparent substance and having a hairline 23 etched thereon, is free to be moved completely at random. One end of the straight edge 22 is preferably weighted so that it will be carried with the paper 13 and not slide thereon. As before stated, lines 18, 19 and 20 indicate times at which the aircraft was observed and the ranges from its target at which it was observed is indicated by marks 24, 25 and 26 respectively. Adjacent the table 15 and rigidly connected thereto is a calibrated scale 31 which forms a part of a slide holder 32. The scale 31 is calibrated in seconds beginning with zero and proceeding to the left or, more broadly, in the direction opposite the direction of movement of the paper 13. The calibration on scale 31 is determined from the speed of the paper 13. Disposed in the slide holder 32 is a calibrated scale 33 which forms a part of a slide holder 34. The slide holder 34 may be moved to the right or left within the holder 32. The scale 33 is preferably calibrated in tenths of miles, hundreds of yards or otherwise as desired beginning with zero and proceeding in a direction opposite the direction of increasing range on the range lines 21. An index 35 on slide holder 34 indicates the right-left position of the slide holder 34 with respect to the scale 31. Disposed in the slide holder 34 is a sliding member 36 which may be moved up or down, i. e. at right angles to the motion of slide holder 34. The sliding member 36 is calibrated in seconds beginning at any convenient zero point and proceeding to the left. The calibration on sliding member 36 is identical to the calibration on scale 31. On the member 36 an index 41 indicates the relative position of the member 36 and slide holder 34 or scale 33. The index 35 and scale 31 are so disposed that when the index 35 coincides with zero on the scale 31 the zero indication on member 36 coincides with a line through the marker 16 and hence zero time. The index 41 and scale 33 are so disposed that when the index 41 coincides with zero on the scale 33 the zero indication of the member 36 coincides with a line drawn through a position of zero range from aircraft to target. The zero range point is not indicated on the table 15 but may be determined by extrapolation of the range lines 21.

In Fig. 2 of the drawing there is shown graphically a typical bombing problem in which an aircraft 51 flying at an altitude H above the ground desires to drop a missile on a target 52. A dotted path 53 indicates the trajectory of the missile while a dash-dot line 55 indicates the anticipated path of the aircraft 51. Further reference will be had to Fig. 2 in the discussion of the device of Fig. 1 which follows.

In the operation of the device illustrated in Fig. 1 the motor 14 causes the paper 13 to move past the marking device 16 at a uniform rate. When the aircraft in question is observed by the operator of the radio object-locating apparatus, he causes the marker circuit 17 to be actuated, thus causing a line, say line 18, to be struck. After sufficient time to permit the calculation of the required data, the operator of this device, Fig. 1, is given the range of the aircraft from its objective which he indicates by a mark 24. On succeeding observations of the aircraft other lines, for example lines 19 and 20, and the corresponding range marks 25 and 26 are struck on the paper 13. If the aircraft velocity is constant and the paper 13 moves with uniform velocity, which conditions are here assumed, then the aircraft positions lie in a straight line over which the hairline 23 of the straight edge 22 may be placed. The straight edge 22 extends over the edge of the table 15 sufficiently to also extend over the scales 31 and 36 and is caused to move with the paper as hereinbefore described.

It will be noted that if the indices 35 and 41 are at their respective zero marks the hairline 23 will cross the zero indication of member 36 at the same time the aircraft reaches zero range from its destination. At any time before the hairline 23 crosses the zero indication on member 36 the reading of the seconds scale on this member, 36, will be the number of seconds which must elapse before the aircraft will be over its target.

Referring to Fig. 2, if the missile were dropped at the position of aircraft 51 and the horizontal velocity of the missile did not change due to windage, the missile would strike the ground at a point 54 after a time, $t_f$, which is the time of fall of the missile. The aircraft 51 will be directly above the point 54 at the time of impact of the missile with the ground. It is seen then that if it is desired that the crossing of the hairline 23 and the zero indication on member 36 be the release point the crossing must occur $t_f$ seconds before the aircraft is over its target. If the holder 34 is slid until the index 35 coincides with the calculated $t_f$ on scale 31, and if the missile is released at the time of the crossing of the hairline 23 and zero on member 36 in the hypothetical case set forth above, it will strike the target at point 54 and directly beneath the aircraft 51. However, the actual case is not so idealized since a missile dropped from the aircraft 51 will strike target 52 after a time, $t_f$, and the aircraft 51 will be directly above point 54 as before. This change in point of impact with the ground from point 54 to point 52 is due to windage or trail as it is called. The trail distance, T, can be calculated for any given $t_f$, aircraft airspeed and missile. By reference to Fig. 2 it will be seen that the aircraft 51 must approach to within a time $t$, which is less than $t_f$, of the target 52 before releasing the missile or that we may release the missile at a time $t_f$ seconds before reaching a virtual target at 54 which is located a distance T beyond the actual target at 52. The member 36 may be moved in the holder 34 until the index 41 coincides with the calculated distance T on scale 33. This will move the zero on member 36 in such a manner as to set up a virtual target at a distance T beyond the actual target. The position of the hairline 23 on the scale of member 36 will indicate the time-to-go before release of the missile as in the first case. Because proper corrections have been made for both the time of fall, $t_f$, and the trail, T, the missile will strike the target 52. Thus means is provided for knowing the exact position of the aircraft without having constant information from the radio object-locating apparatus and of informing the aircraft operator of the exact time he reaches his destination or at which he should release his bombs in order that they strike the desired target.

While there has been described what is at present considered the preferred embodiment of the invention, it will be obvious to those skilled in the art that various changes and modifications may be made therein without departing from the invention.

What is claimed is:

1. A mechanical device adapted to be used in combination with a record sheet for indicating the future position of aircraft and time of arrival at a predetermined point by the use of data derived from radio object-locating equipment, said device comprising driving means, marking means, supporting means having suitable calibrations thereon and adapted to be illuminated, means driven by said driving means for moving the record sheet over said supporting means and past said marking means at a uniform rate, a first scale calibrated in time units and disposed adjacent said supporting means, a second scale calibrated in distance units and having a first index thereon, said first scale and said second scale being disposed at right angles to each other, said second scale being further disposed so as to be movable relative to said first scale whereby said first index will indicate the relative positions thereof, a third scale calibrated in time units and having a second index thereon, said first and third scale being disposed parallel to each other and said third scale being further disposed so as to be movable relative to said second scale whereby said second index will indicate the relative positions thereof, and a straight edge adapted to be aligned through plotted points on the record sheet and moved therewith whereby the future position and time of arrival of an aircraft at a predetermined point may be determined from the crossing of said straight edge and points on said third scale.

2. A mechanical device adapted to be used in combination with a transparent record sheet for indicating the future position of aircraft and time of arrival at a predetermined point by the use of data derived from radio object-locating equipment, said device comprising driving means, marking means, a surface having suitable range calibrations thereon, means driven by said driving means for moving the transparent record sheet over said surface and past said marking means at a uniform rate, a first scale calibrated in time units and disposed adjacent said supporting means, a second scale calibrated in distance units and having a first index thereon, said first scale and said second scale being disposed at right angles to each other, said second scale being further disposed so as to be movable relative to said first scale, whereby said first index will indicate the relative positions thereof, a third scale calibrated in time units and having a second index thereon, said first and third scales being disposed parallel to each other and said third scale being further disposed so as to be movable relative to said second scale, whereby said second index will indicate the relative positions thereof, and a straight edge adapted to be aligned through plotted points on the record sheet and moved therewith, whereby the future position and time of arrival of an aircraft at a predetermined point may be determined from the crossing of said straight edge and points on said third scale.

3. A mechanical device adapted to be used in combination with a transparent record sheet for indicating the future position of aircraft and time of arrival at a predetermined point by the use of data derived from radio object-locating equipment, said device comprising driving means, electrical marking means for burning lines at intervals in the record sheet, a surface having suitable range calibrations thereon, means driven by said driving means for moving the transparent record sheet over said surface and past said marking means at a uniform rate, a first scale calibrated in time units and disposed adjacent said supporting means, a second scale calibrated in distance units and having a first index thereon, said first scale and said second scale being disposed at right angles to each other, said second scale being further disposed so as to be movable relative to said first scale whereby said first index will indicate the relative positions thereof, a third scale calibrated in time units and having a second index thereon, said first and third scales being disposed parallel to each other and said third scale being further disposed so as to be movable relative to said second scale whereby said second index will indicate the relative positions thereof, and a straight edge adapted to be aligned through plotted points on the record sheet and moved therewith whereby the future position and time of arrival of an aircraft at a predetermined point may be determined from the crossing of said straight edge and points on said third scale.

EDWARD E. MILLER.

REFERENCES CITED

The following references are of record in the file of this patent:

UNITED STATES PATENTS

| Number | Name | Date |
| --- | --- | --- |
| 2,027,926 | Myers et al. | Jan. 14, 1936 |
| 2,066,498 | Watson | Jan. 5, 1937 |
| 2,071,425 | Papello | Feb. 23, 1937 |

FOREIGN PATENTS

| Number | Country | Date |
| --- | --- | --- |
| 4,311 | (1907) Great Britain | Feb. 21, 1907 |
| 291,023 | Great Britain | Nov. 22, 1928 |